United States Patent [19]

Sasaki et al.

[11] 4,102,694

[45] Jul. 25, 1978

[54] REFRACTORY MATERIAL FOR REPAIRING BLAST FURNACES

[75] Inventors: Kantaro Sasaki, Ashiya; Hiroshi Yamaoka, Hirakata; Takao Suzuki, Takarazuka, all of Japan

[73] Assignee: Sumitomo Metal Industries, Limited, Osaka, Japan

[21] Appl. No.: 725,468

[22] Filed: Sep. 22, 1976

Related U.S. Application Data

[62] Division of Ser. No. 581,436, May 28, 1975, abandoned.

[51] Int. Cl.² ............................................. C04B 35/02
[52] U.S. Cl. .................................. 106/56; 106/57; 106/58; 264/30
[58] Field of Search ................. 106/56, 58, 57; 264/30

[56] References Cited

U.S. PATENT DOCUMENTS

| | | | |
|---|---|---|---|
| 3,285,760 | 11/1966 | Hildinger et al. ...................... | 106/58 |
| 3,427,369 | 2/1969 | Parsons .................................. | 264/30 |
| 3,846,144 | 11/1974 | Parsons et al. ......................... | 106/56 |

*Primary Examiner*—J. Poer
*Attorney, Agent, or Firm*—Watson, Cole, Grindle & Watson

[57] ABSTRACT

A refractory material for repairing blast furnaces, which is composed of 100 parts by weight of a base material chiefly consisting of at least one powdery refractory material selected from the group consisting of $SiO_2$, $Al_2O_3$, $MgO$, $Cr_2O_3$, $ZrO_3$, $CaO$ and $FeO_2$ and containing, if necessary, 0.5 to 5.0 parts by weight of iron ore powder, fibrous metal or inorganic substance, 4 to 40 parts by weight of a bituminous material consisting of a petroleum pitch or coal tar pitch in the solid, or liquid phase with a softening point ranging from 70 to 250° C, and 10 to 35 parts by weight of a liquid oil consisting of a mineral oil, fish oil or vegetable oil and containing, if necessary, 0.1 to 10 parts by weight of a thermosetting synthetic resin, thermosoftening synthetic resin or natural resin.

15 Claims, No Drawings

REFRACTORY MATERIAL FOR REPAIRING BLAST FURNACES

This is a division, of application Ser. No. 581,436 filed May 28, 1975 now abandoned.

This invention relates to refractory materials in the form of a slurry used for repairing high temperature furnaces for smelting or the like, for instance, blast furnaces lined with a refractory material.

The refractory bricks used for lining blast furnaces are subject to erosion due to descending of the burden, reaction with the burden at high temperatures or contact with the pig iron. Usually, after the blast furnace is continuously operated for two or three years, its shaft, belly and bosh are locally damaged, leading to hazardous incandescent iron shell or cracks on the shell. Therefore, the damaged portions must be repaired by pouring and solidifying a refractory material to protect these portions from heat.

The repairing material usually employed is prepared by using a powdery refractory material as a base material, to which a binder such as sodium silicate, aluminum phosphate or aluminous cement and about 15 to 30 percent of water as a fluidity imparting agent are added to form a slurry, for instance, a slimy mortar, capable of pouring by a pump. (Although the water added here not only serves to impart fluidity but is also presumed to participate in hardening and other reactions, it is mentioned here as fluidity imparting agent for only its main operational effect for the sake of brevity of the description.) The repairing material poured by a pump through a nozzle into the interior of the furnace from the outside of the iron shell is required to be firmly adhered to the inner wall of the iron shell of the blast furnace and hardened to protect the iron shell from the heat within the furnace.

However, while the presently employed repairing material of the aforementioned composition is firmly adhered to the iron shell to achieve the intended end at normal temperature or temperatures below 200° C, it is hardly adhered to the iron shell at high temperatures above 300° C. This is because of the use of water as a fluidity imparting agent. When such repairing material is brought into contact with iron shell at a high temperature above 200° C, the iron shell surface is instantly covered with a steam film, which prevents the repairing material from being adhered to the iron shell. Besides, since water is lost due to evaporation, hydration reactions that are necessary for the hardening of the repairing material cannot proceed; hence the effect that the repairing material attaches itself to the iron shell as it hardens can no longer be obtained. Therefore, it is common practice at present to hold the iron shell temperature below 200° C by means of water sprayed on the outside surface of the iron shell or blowing steam into the interior of the furnace or by the provision of a cooling cylinder. These methods, however, are not desirable because they are likely to cause the cooling of the furnace.

An object of the present invention is to provide a refractory material for repairing high temperature regions of blast furnaces, which overcomes the difficulties inherent in the prior art repairing materials and permits the repair to be readily carried out. The refractory material featured by the invention is composed of 100 parts by weight of a base material chiefly consisting of a powdery refractory material, 4 to 40 parts by weight of a bituminous material added as binder and 10 to 35 parts by weight of a liquid oil added as a fluidity imparting agent.

The powdery refractory material mentioned above is practically the same as the ordinary mortar base material. Examples of it are aluminate, siliceous, magnesite and chrome refractories, more specifically, $SiO_2$, $Al_2O_3$, $MgO$, $Cr_2O_3$, $ZrO_2$, $CaO$ and $FeO$, or mixtures of two or more of these substances. In addition, it may contain 0.5 to 5.0 parts by weight of mineral powder such as iron ore powder and coke powder or a fibrous metal or inorganic substance. Further, it may contain 0.2 to 6.0 parts by weight of a binder agent such as $Al_2O_3$ cement, anhydrous silicate, bentonite or clay.

The bituminous material consists of either coal tar pitch or petroleum pitch. If necessary, coal tar or asphalt in either the solid or liquid phase may be added to it. It is used within a range of 4 to 40 parts by weight with respect to 100 parts by weight of the base material. If its proportion is less than 4 parts by weight, the effect of binding the base material is insufficient, so that firm repair portions cannot be formed. On the other hand, increasing its proportion beyond 40 parts by weight leads to no added effect but rather weakens the repair portions.

The above bituminous materials should have softening points within a range between 70° to 250° C. This is required for forming a firmly attached repair layer in regions which are at temperatures around or about 500° C. Similar to the base material, the bituminous material is used in the form of powder with average grain size not exceeding 3 mm to permit operation of the pump. It is possible to selectively mix different bituminous materials to suit the temperature of the iron shell provided that the softening point of the resultant mixture is within the range between 70° to 250° C. In this way, the ranges of adhesion and hardening temperatures can be increased, and also it is possible to meet situations where the temperature of the iron shell is not uniform.

The liquid oil serving as a fluidity imparting agent acts as a dispersion medium for the base material and binder and permits the whole system to be poured from a nozzle by a pump into the repair portions. Examples of it are mineral oils such as heavy oil, naphtha, naphthalene oil and anthracene oil, or middle oil, fish oils such as whale oil and sardine oil or vegetable oils such as colza oil, soy bean oil and linseed oil. To fulfill its role, its proportion roughly ranges between 10 and 35 parts by weight. To the liquid oil may be added from 0.1 to 10 parts by weight such thermosetting synthetic resins as phenolic furan, urethane and epoxy, such thermosoftening synthetic resins as vinyl chloride, polyethylene and polystyrene of such natural resins as resin.

Preferably the refractory material is composed of 100 parts by weight of base material, 8 to 35 parts by weight of bituminous material and 15 to 35 parts by weight of liquid oil. When the refractory material for repairing as mentioned above according to the invention is poured into the interior of the iron shell at a temperature above 200° C from a nozzle (for example as shown in Japanese laid open Utility Model publication No. 29902/1975) by a pump (with a maximum pumping pressure of 30kg/cm², a pumping capacity of 200l/min, and a requisite operating power of 7.5KW), the binder is softened or fused to entrap the base material and mineral powder and firmly attach them to the iron shell. While the binder and fluidity imparting agent are partly combusted, the majority of the combusted matter coexists in gaseous form with the reducing gas within the blast furnace, thus contributing to the reduction of the ore. These combustible materials can be introduced into the high temperature atmosphere within the furnace practically in the noncombusted state by virtue of low partial oxygen pressure within the furnace. Moreover, since the repairing refractory material according to the invention has no water content, no steam film is formed at the time of its contact with the high temperature iron shell. Thus, the adhesion of the refractory material to the iron shell is not impeded, and also the strength after the adhesion is sufficiently high.

EXAMPLE 1

Two different pitches, namely A pitch and B pitch as shown in Tables 1 and 2 below, as a binder and A heavy oil as a fluidity imparting agent as shown Table 2 below, were added to 100 parts by weight of powdery aluminate refractory material to prepare the respective repairing refractory materials.

Table 1

| Bituminous material | Softening temperature | Melting temperature |
| --- | --- | --- |
| A | 60° C | 120° C |
| B | 220° C | 260° C |

These materials were poured onto iron plates held at the temperatures listed in Table 2 below to a thickness of 5 cm from a nozzle by a pump to measure the adhesion and compression strength. The results of the measurements are as shown in Table 2.

Table 2

| Iron shell temperature (° C) Reference sample* | | | Adhesion | | | | Compression strength (kg/cm²) | | | |
| --- | --- | --- | --- | --- | --- | --- | --- | --- | --- | --- |
| | | | 100 | 300 | 500 | 700 | 100 | 300 | 500 | 700 |
| | | | x | x | x | | 60 | 23 | 15 | 10 |
| | Binder (parts by wt.) | Liquid oil (parts by wt.) | | | | | | | | |
| Sample No. 1 (A pitch) | 25 | 24 | ○ | ○ | ○ | Δ | 81 | 52 | 26 | 6 |
| Sample No. 2 (B pitch) | 25 | 24 | ○ | ○ | ○ | ○ | 3 | 30 | 64 | 66 |
| Sample No. 3 (B pitch) | 8 | 15 | ○ | ○ | ○ | ○ | 1 | 22 | 48 | 50 |
| Sample No. 4 (B pitch) | 35 | 30 | ○ | ○ | ○ | ○ | 5 | 40 | 70 | 73 |

*○: Adhered
Δ: Weakly adhered
x: Not adhered
*The reference sample is a fluid refractory material consisting of aluminate refractory material powder and containing sodium silicate as a hardening agent and 18% of water as a fluidity imparting agent.

As is seen from Table 2, the refractory materials using B pitch as binder according to the invention are far superior both in adhesion and compression strength to the sample using A pitch, the softening point of which is outside of the scope of the invention, and also to the reference sample.

EXAMPLE 2

A repairing material was prepared by combining 100 parts by weight of aluminate refractory material powder as a base material, 25 parts by weight of B pitch mentioned in Example 1 as a binder and 24 parts by weight of A heavy oil also mentioned in Example 1 as a fluidity imparting agent. This repairing material was poured into a blast furnace iron shell with a volume of 1350 m³. The residual wall thickness of the iron shell portion where the repairing material was poured had been 0 to 50 mm, and the temperature of that portion was 400° to 500° C. The repairing material was poured from a nozzle by the pump through a bored pouring hole. About one month of operation after the pouring of the repairing material, the wall thickness was measured at the rest time, and the measured residual wall thickness was 200 to 350 mm. Besides, the iron shell surface temperature measured was below 100° C.

EXAMPLE 3

A repairing refractory material prepared by combining 75 parts by weight of aluminate refractory material powder, 15 parts by weight of C pitch (with a softening point of 200° C), 10 parts by weight of D pitch (with a softening point of 85° C) and 22 parts by weight of A heavy oil was poured from a nozzle by the pump and hardened to form a repair layer with a thickness of 60 cm. As a result, the iron shell surface temperature was reduced to be below 100° C.

We claim:

1. A method for repairing linings on internal walls of blast furnaces within their operational cycle comprising the steps of forming a nonaqueous repair material which material is composed of 100 parts by weight of a base material chiefly composed of a powdery refractory material, 4 to 40 parts by weight of a bituminous material serving as a binder and 10 to 35 parts by weight of a liquid oil serving as a fluidity imparting agent, pouring the repair material into a blast furnace under pressure while said furnace is at a temperature elevated above a surrounding ambient temperature during the operational cycle of said furnace, and allowing the repair material to cure to thereby repair defects in the lining of the blast furnace.

2. A method according to claim 1, wherein the repair material is pumped under pressure into said blast furnace.

3. A method according to claim 2, wherein the softening point of said bituminous material ranges between 70° and 250° C.

4. A method according to claim 2, wherein said powdery refractory material is comprised predominantly of at least one member of the group consisting of $SiO_2$, $Al_2O_3$, $MgO$, $Cr_2O_3$, $ZrO_2$, $CaO$ and $FeO$.

5. A method according to claim 4, wherein said powdery refractory material contains 0.5 to 5.0 parts by weight of powdery iron ore.

6. A method according to claim 4, wherein said powdery refractory material contains 0.5 to 5.0 parts by weight of a fibrous metal.

7. A method according to claim 4, wherein said powdery refractory material contains 0.5 to 5.0 parts by weight of a fibrous inorganic substance.

8. A method according to claim 4, wherein said powdery refractory material contains 0.2 to 6.0 parts by weight of a member selected from the group consisting of aluminuous cement, anhydrous silicate, bentonite and clay as a binder agent.

9. A method according to claim 2, wherein said bituminous material is in the solid state.

10. A method according to claim 2, wherein said bituminous material is in the liquid state.

11. A method according to claim 2, wherein said liquid oil is a member of the group consisting of mineral oils, fish oils, and vegetable oils.

12. A method according to claim 11, wherein said liquid oil is a member of the group consisting of heavy mineral oil, naphtha, naphthalene oil, anthracene oil, whale oil, sardine oil, colza oil, soy bean oil and linseed oil.

13. A method according to claim 11, wherein said liquid oil contains 0.1 to 10 parts by weight of at least one member of the group consisting of synthetic resins, and natural resins.

14. A method according to claim 13, wherein said resins are selected from the group consisting of phenolic, furan, urethane, epoxy, vinyl chloride, polyethylene, and polystyrene resin.

15. A method according to claim 2, wherein said material is composed of 100 parts by weight of said base material 8 to 35 parts by weight of said bituminous material and 15 to 35 parts by weight of said liquid oil.

* * * * *